2,987,025
ANTI-BROACH SYSTEM FOR TORPEDOES

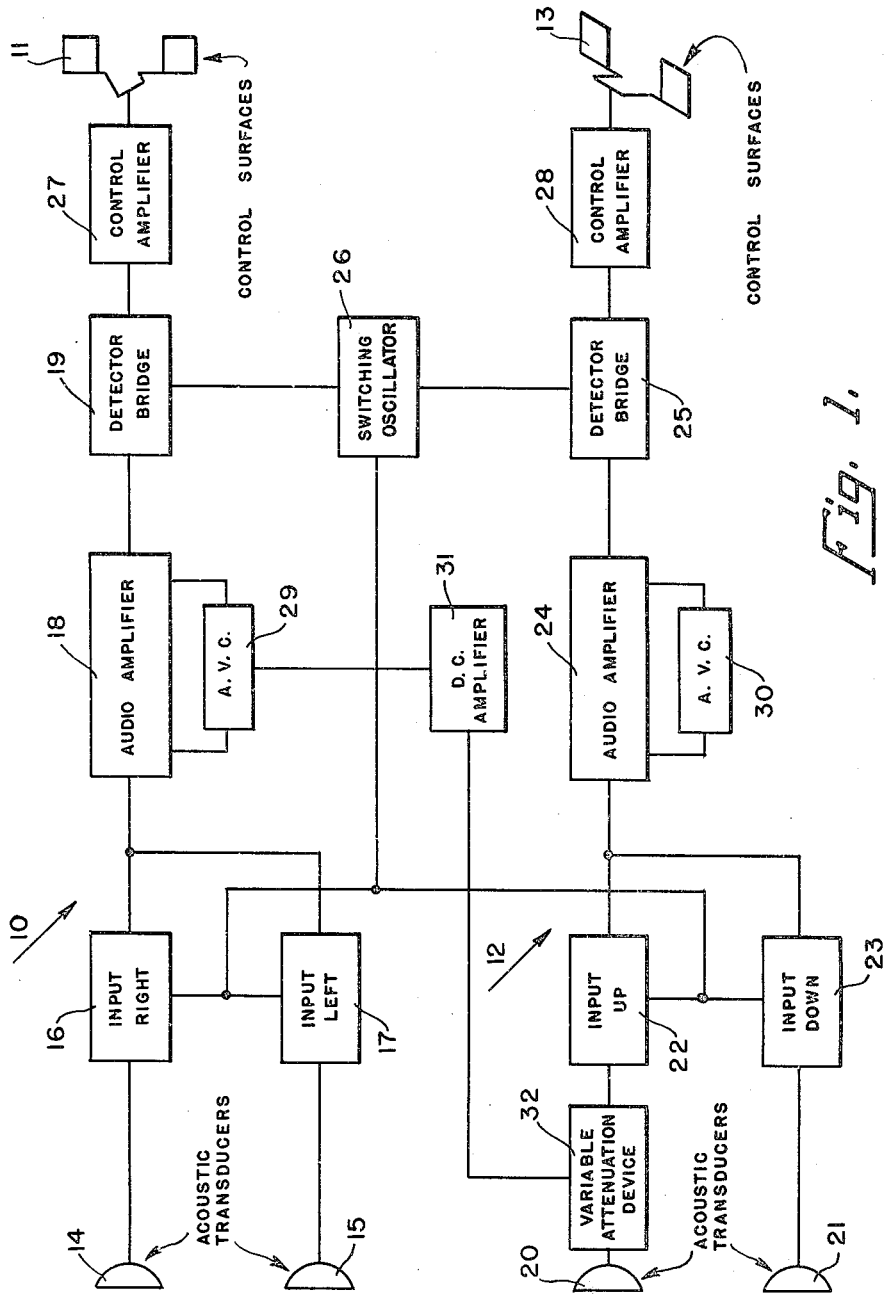

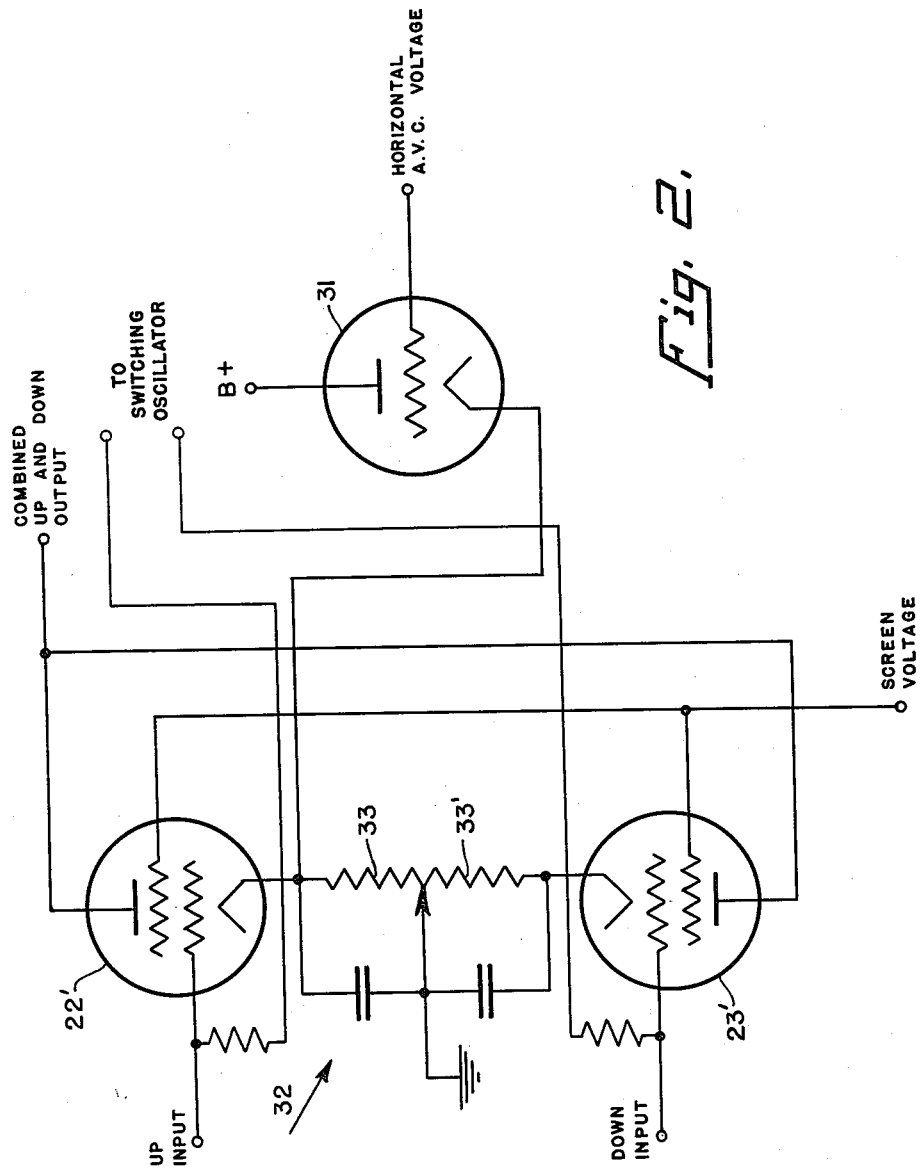

Robert A. Cunningham, Keyport, Wash., assignor to the United States of America as represented by the Secretary of the Navy
Filed May 19, 1954, Ser. No. 431,015
13 Claims. (Cl. 114—23)
(Granted under Title 35, U.S. Code (1952), sec. 266)

The invention described herein may be manufactured and used by or for the Government of the United States of America for governmental purposes without the payment of any royalties thereon or therefor.

The present invention relates to acoustic homing torpedoes and more particularly to an improved guidance or homing system for passive-acoustic torpedoes.

Acoustic torpedo guidance systems of the type to which this invention pertains employ generally four acoustic target-sensing elements generally termed transducers or hydrophones, located in the nose of the torpedo, two of which sensing elements, in the normal horizontal position of the torpedo, are disposed in the horizontal (azimuth) plane on either side of the longitudinal axis of the torpedo and the other two of which are disposed in the vertical plane above and below the longitudinal axis of the torpedo. During periods of target-sensing, the acoustic guidance system functions to compare the acoustic inputs to the hydrophones of each pair of hydrophones and actuate the torpedo azimuth control surfaces in accordance with the relative signal strengths of the input signals to the horizontally disposed acoustic target-sensing elements, and the torpedo depth-steering surfaces in accordance with the relative strengths of the input signals to the vertically disposed target-sensing elements. Torpedoes having acoustic guidance systems of the type described above were subject to frequent broaching when fired at a relatively remote target, owing to the fact that during the early part of the run, when torpedo-target distance was relatively great, target-signal level was relatively low and the surface reflection of the torpedo self-noise provided a noise-signal which was greater in intensity than the target signal, with the result that the torpedo would home on such surface reflection and be caused to broach. Heretofore, various arrangements have been proposed for preventing the broaching of a torpedo employing a passive acoustic guidance system. One such arrangement included a cricuit for providing a fixed attenuation in association with the "up" hydrophone, whereby the signal input to the "up" hydrophone would have to exceed a certain predetermined level before the depth control surfaces would be actuated in a manner to cause the torpedo to climb. Such an arrangement proved to be unsatisfactory, however, since a fixed "up" attenuation of a value sufficient to prevent the unit from climbing toward its surface reflected image would cause serious impairment of the torpedo vertical-channel sensitivity to the real target.

The present invention avoids the disadvantages which have been inherent in the prior torpedo acoustic guidance systems employing anti-broach circuits, by providing a torpedo acoustic control circuit wherein there is applied to the input stage of the "vertical" channel a variable "up" attenuation, the value of which is automatically varied so as to be at all times inversely proportional to the signal level in the "horizontal" channel, whereby the "up" attenuation will be maximum when the torpedo-target range is maximum, the attenuation gradually decreasing with decrease in target range, whereby, upon the torpedo approaching the target, the vertical-channel sensitivity of the torpedo guidance system is increased. Thus, attacking of the surface reflection of its self-noise by the torpedo will be effectively prevented without serious impairment of the vertical-channel sensitivity of the guidance system to the real target.

In accordance with the foregoing, it is an object of the present invention to provide an improved torpedo passive acoustic guidance system.

Another object of the invention is to provide an improved passive acoustic guidance system for torpedoes, incorporating means for preventing homing of the torpedo on the surface reflection of its self-noise during the early part of the torpedo run.

Still a further object of the invention is to provide an improved passive acoustic torpedo guidance system wherein there is automatically applied to the input stage of the vertical channel a variable "up" attenuation which is inversely proportional to the signal strength in the horizontal channel, whereby attacking of the surface-reflected image of its self-noise by the torpedo will be substantially eliminated without serious impairment of the vertical-channel sensitivity of the torpedo to the real target, broaching of the torpedo during the early part of its run being thereby substantially eliminated.

Other objects and many of the attendant advantages of the present invention will become apparent as the same becomes better understood from the following detailed descriptions had in conjunction with the annexed drawings wherein:

FIG. 1 schematically illustrates an acoustic guidance system incorporating the variable attenuation principle of the present invention; and FIG. 2 schematically illustrates a preferred detail of the variable attenuation arrangement for the present invention.

Referring now to the drawings and more particularly to FIG. 1, the acoustic control circuit of the present invention comprises a horizontal channel 10 which acts to control the torpedo azimuth control surfaces 11, and a vertical channel 12 which acts to control the torpedo depth-steering surfaces 13. Horizontal channel 10 comprises a pair of acoustic transducers or sensing elements 14 and 15, transducer 14 having its acoustic axis directed to starboard and transducer 15 having its acoustic axis directed to port. The output signals of transducers 14 and 15, which signals will, in the conventional manner, vary in accordance with the intensity of the sonic vibrations impinging on the respective transducers, are fed to a pair of input amplifiers 16 and 17, one amplifier being associated with each of the transducers 14 and 15. Input amplifiers 16 and 17 are coupled in parallel to an audio-amplifier 18 the output of which is applied to an electrical detector bridge circuit 19. Similarly, the vertical channel 12 includes a pair of acoustic transducers 20 and 21, transducer 20 having its axis directed upwardly from a horizontal plane including the longitudinal axis of the torpedo, and transducer 21 having its axis directed downwardly from said plane. Associated with the transducers 20 and 21 are a pair of input amplifiers 22 and 23, one being associated with each of the transducers. Input amplifiers 22 and 23 are coupled in parallel to the audio-amplifier 24, the output of which is applied to an electrical detector bridge circuit 25. A switching oscillator 26 is, in the conventional manner, electrically connected to each of the detector bridge circuits 19 and 25 and to the four input amplifiers 16, 17, 22, and 23, as shown, and acts to alternately apply the outputs of the right and left input amplifiers 16 and 17, respectively, to the horizontal channel audio-amplifier 18, and to alternately apply the outputs of the "up" and "down" amplifiers 22 and 23, respectively, to the vertical channel audio-amplifier 24. The switching oscillator also provides synchronous switching action for each of the detector bridges, these bridges functioning to compare the right and left (and up and down) target direction components of the combined signals applied thereto by amplifiers 18 and 24. The output of the horizontal channel bridge circuit 19, which will be a signal the polarity of which will be determined by the relative intensities of the sonic vibrations impinging on the horizontally disposed transducers 14 and 15, is applied to a control amplifier 27 for actuating the azimuth control surfaces 11 in a direction to direct the torpedo in azimuth toward the target source of the acoustic signal. Similarly, the output of the vertical channel bridge circuit 25, which will be a signal whose polarity will be determined by the relative intensity of the sonic inputs to the vertically disposed transducers 20 and 21, is applied to the vertical channel control amplifier 28 for actuating the depth-steering surfaces 13 in a direction to steer the torpedo in depth toward the acoustic signal source. Associated with each of the audio-amplifiers 18 and 24 is an automatic volume control circuit, generally indicated at 29 and 30, respectively, which acts in a conventional manner to provide a negative voltage whose value is proportional to the signal level in each of the associated amplifiers. The improvement of the present invention, referring to FIG. 1, comprises in general a variable attenuation device 32 electrically associated with the "up" hydrophone 20 or with its input amplifier 22, and a D.C. amplifier 31 electrically connected to the negative side of the automatic volume control circuit 29 in the horizontal channel 10. Provision of variable attenuation in the "up" branch of the elevation channel may of course be accomplished in any desired practical manner, FIG. 1 presenting a generalized schematic block diagram thereof. Referring now to FIG. 2 wherein a preferred embodiment of the vertical channel amplifiers, the variable attenuation means, and the D.C. amplifier, is shown schematically in greater detail, the vertical channel input amplifiers 22 and 23 comprise a pair of amplifier tubes, 22' and 23', the plates of which are connected in parallel, as shown, whereby to provide a combined "up" and "down" output terminal which, as shown in FIG. 1, is connected to the vertical channel audio-amplifier tubes 24. The grid of amplifier 22' is connected to the output of the "up" acoustic transducer 20 and the grid of amplifier tube 23' is connected to the output of the "down" acoustic transducer 21. Bias for the input amplifier tubes 22' and 23' is provided by electrically connecting the cathodes thereof by a resistor which has a variable intermediate point thereof grounded, as shown, whereby to form a pair of cathode resistors 33 and 33' associated with the amplifier tubes 22' and 23'. These cathode resistors are bypassed by condensers, as shown. D.C. amplifier 31 comprises an amplifier tube, as shown, having its plate connected to a positive voltage source, its grid connected to the negative side of the automatic volume conrol circuit in the horizontal channel, as shown in FIG. 1, and its cathode connected to the cathode end of the cathode resistor 33 of amplifier tube 22'. Amplifier tubes 22' and 23' may each include a screen grid, as shown, connected to a source of screen voltage.

The operation of the present invention is as follows. During periods of target-sensing, the intensity of the acoustic signals impinging on each of the acoustic sensing devices 14, 15, 20, and 21 will be determined by the heading of the torpedo relative to the target or other acoustic signal source. If the axis of the torpedo is directed otherwise than directly at the source of the acoustic signal, the intensity of the acoustic signal impinging on certain of the acoustic transducers 14, 15, 20, and 21 will be greater than the signal impinging on the other ones of the transducers and the resultant output signals of the horizontal and vertical control amplifiers 27 and 28, respectively, will be such as to actuate the torpedo control surfaces 11 and 13 in a manner to change the heading of the torpedo in the direction of the acoustic signal source. In the early part of the attack phase, that is, when the torpedo-target range is relatively great, the target-signal level in the horizontal channel 10 is low with the result that the negative voltage provided by the automatic volume control circuit 29 in the horizontal channel 10 is low. Thus, during the early part of the attack phase the bias on the grid of the D.C. amplifier 31 will be relatively low whereby to allow maximum current flow through cathode resistor 33 of the "up" input amplifier tube 22' with the resultant biasing of the "up" input tube 22' to apply maximum "up" attenuation. The arrangement is such that during the early part of the attack phase the attenuation is sufficient to prevent the torpedo from attacking the surface-reflected image of is self-noise. As the torpedo more closely approaches the target or other source of the acoustic signal, the voltage output of the automatic volume control circuit 29 in the horizontal channel 10 becomes more negative whereby to gradually increase the bias on the D.C. amplifier 31, with a resultant decrease in the current flowing through cathode resistor 33 and hence reduction in the "up" attenuation. Eventually, the A.V.C. voltage becomes sufficiently negative to cut off D.C. amplifier 31, thereby removing the "up" attenuation for the "up" input amplifier 22.

In the above-described embodiment, the circuitry associated with screen-grid tube 22' serves to supply both the function of variable attenuation and the function of up-input amplification. The specific circuitry shown in FIG. 2 thus represents a simplification of the circuits shown in the more generalized block diagram form in FIG. 1 as a variable attenuation device 32 and an up-input amplifier 22 which separately provide the said functions.

From the above, it will be apparent that the present invention provides a system for preventing broaching of a passive acoustic torpedo, comprising an arrangement for producing a variable "up" attenuation which is maximum during the early part of the attack phase when the ratio of surface-reflected torpedo self-noise to target-signal is greatest and which "up" attenuation is gradually decreased with decrease in target range, whereby, when the target-signal becomes sufficiently greater than the surface reflected torpedo self noise, the "up" attenuation is substantially reduced or entirely removed so as to not cause serious impairment of the vertical-channel sensitivity of the torpedo guidance system to the actual target.

Obviously many modifications are possible in the light of the above teachings. It is therefore to be understood that within the scope of the appended claims, the invention may be practiced otherwise than as specifically described herein.

What is claimed is:

1. A guidance system for torpedoes, comprising: a horizontal control channel, including right and left target-sensing elements for providing a pair of target signals having relative amplitudes dependent upon target direction in azimuth; azimuth steering surfaces; means responsive to said signals for controlling said surfaces to effect steering toward said target in azimuth; said horizontal channel further including circuit means providing a control voltage corresponding to signal level in said horizontal channel; a vertical control channel, including up and down target-sensing elements for providing a pair of up and down target signals having relative amplitudes dependent upon target direction in depth; variable attenuating means responsive to said control voltage for effecting attenuation of one of said pair of up and down target signals as a direct function of signal level in said horizontal channel; depth steering surfaces; and means for controlling said depth steering surfaces in response to the relative amplitudes of said attenuated target signal and the other of said pair of up and down target signals to effect steering of the torpedo in a depth plane toward the direction in depth corresponding to the relative amplitudes of said attenuated target signal and the other of said pair of up and down target signals.

2. A guidance system according to claim 1 wherein said one target-sensing element is the up-target-sensing element.

3. A guidance system according to claim 2 wherein said circuit means comprises an automatic volume control circuit for producing said voltage, said voltage having negative polarity and a value proportional to the target-signal level in the horizontal channel.

4. A guidance system according to claim 2, and means separately for amplifying the output of said up and down target-sensing elements, said attenuating means comprising a circuit for varying the gain of one of said amplifying means in accordance with the value of said voltage.

5. A guidance system according to claim 3, and means for separately amplifying the output of said up and down target-sensing elements, said attenuating means comprising a circuit for varying the gain of one of said amplifying means in accordance with the value of said negative voltage.

6. A guidance system according to claim 5 wherein said circuit includes a cathode resistor in one of said amplifying means, and means for producing in said resistor a negative bias current proportional to the value of said negative voltage.

7. A guidance system according to claim 6 wherein said last mentioned means comprises an amplifier having its grid connected to said negative voltage and its cathode connected to the cathode end of said resistor whereby an increase in said negative voltage resulting from an increase in the target-signal level in the horizontal channel will act to reduce the negative bias current through said resistor and thereby reduce the attenuation.

8. In a torpedo acoustic guidance system of the type comprising a pair of electrical control channels each including a pair of target-sensing elements and an electrical circuit connected to the outputs of the associated pair of elements for comparing the acoustic inputs to said elements, and wherein one of said channels serves to actuate the torpedo azimuth steering surfaces, and the other of said channels serves to actuate the torpedo depth steering surfaces, the improvements comprising first means in said one channel for producing a voltage proportional to the target-signal level therein, and second means in the other channel, controlled by said voltage, for attenuating the output of one of the target-sensing elements in said other channel as a function of the target-signal level in said one channel.

9. The arrangement according to claim 8 wherein said first means comprises an automatic volume control circuit and said voltage has a negative polarity and a value proportional to the target-signal level in said one channel.

10. The arrangement according to claim 8, and means for separately amplifying the outputs of the target-sensing elements, in said other channel, said second means comprising a circuit for varying the gain of one of said amplifying means in accordance with the value of said voltage.

11. The arrangement according to claim 9, and means for separately amplifying the outputs of the target-sensing elements in said other channel, said second means comprising a circuit controlled by said negative voltage for varying the gain of one of said amplifying means in accordance with the value of said negative voltage.

12. The arrangement according to claim 11 wherein said last mentioned circuit comprises a cathode resistor in one of said amplifying means, and means for producing a negative bias current through said resistor proportional to said negative voltage.

13. The arrangement according to claim 12 wherein said last mentioned means comprises an amplifier having its grid connected to said negative voltage and its cathode connected to the cathode end of said resistor whereby an increase in said negative voltage resulting from an increase in the target-signal level in said one channel will act to reduce the negative bias current through said resistor and thereby reduce the attenuation.

References Cited in the file of this patent
UNITED STATES PATENTS

| | | |
|---|---|---|
| 2,382,058 | Hull | Aug. 14, 1945 |
| 2,414,449 | Chopin | Jan. 21, 1947 |
| 2,427,523 | Dolberg | Sept. 16, 1947 |
| 2,566,858 | Sebring | Sept. 4, 1951 |